(12) United States Patent
Mizuno

(10) Patent No.: US 8,905,525 B2
(45) Date of Patent: Dec. 9, 2014

(54) TIMING DETECTION DEVICE, AND DRIVING DEVICE AND IMAGE FORMING APPARATUS WITH THE SAME

(71) Applicant: KYOCERA Document Solutions Inc., Osaka-shi, Osaka (JP)

(72) Inventor: Masahiko Mizuno, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 14/064,665

(22) Filed: Oct. 28, 2013

(65) Prior Publication Data

US 2014/0118434 A1    May 1, 2014

(30) Foreign Application Priority Data

Oct. 31, 2012    (JP) .................. 2012-240147

(51) Int. Cl.
*B41J 29/393* (2006.01)
*G01D 5/347* (2006.01)
*G03G 15/00* (2006.01)

(52) U.S. Cl.
CPC ........... *B41J 29/393* (2013.01); *G01D 5/34707* (2013.01); *G03G 15/5008* (2013.01); *G03G 15/757* (2013.01)
USPC .............................................. 347/81; 347/19

(58) Field of Classification Search
None
See application file for complete search history.

(56) References Cited

U.S. PATENT DOCUMENTS

| | | | |
|---|---|---|---|
| 6,424,811 | B1 | 7/2002 | Tsuda et al. |
| 2007/0108376 | A1 | 5/2007 | Kudo et al. |

FOREIGN PATENT DOCUMENTS

| | | |
|---|---|---|
| JP | 59-109914 | 7/1984 |
| JP | 2000-213962 | 8/2000 |
| JP | 2000-281233 | 10/2000 |
| JP | 2006-113825 | 4/2006 |

*Primary Examiner* — Lamson Nguyen
(74) *Attorney, Agent, or Firm* — Gerald E. Hespos; Michael J. Porco; Matthew T. Hespos

(57) ABSTRACT

A timing detection device includes a moving object, an opening, a sensor unit, and a timing detection unit. The moving object includes a first face and a second face. The first face and the second face move in a moving direction that is parallel to faces. The openings are formed by penetrating the moving object from the first face to the second face. The sensor unit emits detection light from the first face side toward the moving object, and receives the detection light that passes through the openings. The moving object includes an inner wall part and an edge part. The inner wall part demarcates a lateral edge of the openings on a downstream side in the moving direction. The edge part protrudes toward the upstream side in the moving direction at an end fringe part on the second face side of the inner wall part.

16 Claims, 11 Drawing Sheets

TIMING DETECTION DEVICE, AND DRIVING DEVICE AND IMAGE FORMING APPARATUS WITH THE SAME

This application relates to and claims priority from Japanese Patent Application No. 2012-240147, filed on Oct. 31, 2012 with the Japan Patent Office, the entire disclosure of which is incorporated herein by reference.

BACKGROUND

The present disclosure relates to a timing detection device for detecting timing based on the movement of a moving object, and a driving device and an image forming apparatus having such a timing detection device.

As a timing detection device for detecting the timing based on the movement of a moving object, known is a technology including a disk member fixed to a drive axis of a drive motor, and a sensor unit. The disk member is provided with a plurality of slits which are opened with a spacing in a circumferential direction. The sensor unit includes a pair of a light-emitting part and a light-receiving part which are fixed so as to sandwich the disk member. Detection light that is emitted from the light-emitting part passes through the slits, and is thereafter received by the light-receiving part. Timing is detected based on the pulse signals that are formed according to the spacing of the slits.

SUMMARY

The timing detection device according to one aspect of the present disclosure includes a moving object, an opening, a sensor unit, and a timing detection unit. The moving object includes a first face and a second face, and has a predetermined thickness between the first face and the second face. The first face and the second face of the moving object move in a moving direction that is parallel to the first face and the second face. The openings are formed by penetrating the moving object from the first face to the second face, and disposed with a spacing in the moving direction. The sensor unit emits detection light from the first face side toward the moving object, and receives the detection light that passes through the openings on the second face side. The timing detection unit detects timing of movement of the moving object based on a pulse signal of the received detection light. The moving object includes an inner wall part and an edge part. The inner wall part demarcates a lateral edge of the openings on an upstream side or a downstream side in the moving direction. The edge part protrudes toward the downstream side or the upstream side in the moving direction at an end fringe part on the first face side or the second face side of the inner wall part.

Moreover, the driving device according to another aspect of the present disclosure includes the timing detection device, and a drive unit. The drive unit generates driving force for moving the moving object.

Moreover, the image forming apparatus according to another aspect of the present disclosure includes the timing detection device, the drive unit, and an image carrier. The image carrier is rotatably driven by the drive unit and carries an image on its surface.

DETAILED DESCRIPTION

An image forming apparatus 10 according to an embodiment of the present disclosure is now explained in detail with reference to the appended drawings.

In this embodiment, a tandem-type color printer is illustrated as an example of the image forming apparatus. The image forming apparatus may also be, for example, a copier, a facsimile device, or a multifunction machine having the foregoing functions.

Figure 1:
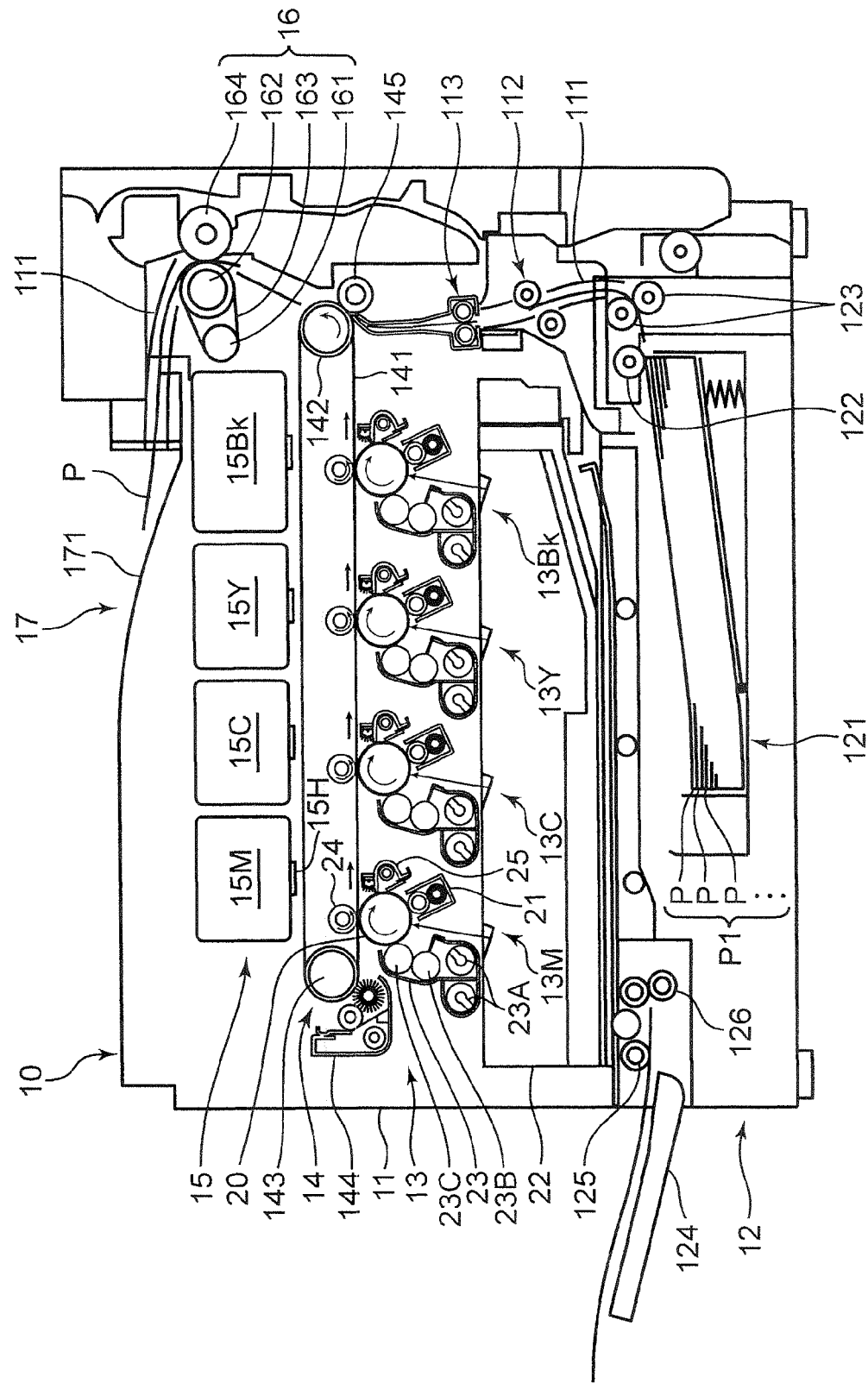
FIG. 1 is a cross section showing the internal structure of the image forming apparatus according to an embodiment of the present disclosure.

FIG. 1 is a cross section showing the internal structure of the image forming apparatus 10. The image forming apparatus 10 has an apparatus body 11 which has a box-shaped cabinet structure. The apparatus body 11 internally houses a paper feeding part 12 for feeding sheets P, an image forming part 13 for forming a toner image to be transferred to the sheet P fed from the paper feeding part 12, an intermediate transfer unit 14 to which the toner image is primarily transferred, a toner supplying part 15 for supplying a toner to the image forming part 13, and a fixation part 16 for performing fixation treatment of fixing, on the sheet P, the unfixed toner image that was formed on the sheet P. In addition, the upper part of the apparatus body 11 includes a paper discharging part 17 to which the sheet P, which was subject to the fixation treatment by the fixation part 16, is discharged.

An operation panel (not shown) for inputting the output conditions and the like of the sheets P is provided at an appropriate location on the upper surface of the apparatus body 11. This operation panel is provided with a power key, and a touch panel and various operation keys for inputting the output conditions.

Additionally formed in the apparatus body 11 is a sheet delivery path 111 extending in a vertical direction at a position that is more on the right side than the image forming part 13. The sheet delivery path 111 is provided with a delivery roller pair 112 for delivering the sheets to an appropriate location. Moreover, a resist roller pair 113 for performing skew correction of the sheets and feeding the sheets, at a predetermined timing, to a nip part of the secondary transfer described later is also provided to the upstream side of the nip part in the sheet delivery path 111. The sheet delivery path 111 is a delivery path for delivering the sheet P from the paper feeding part 12 to the paper discharging part 17 via the image forming part 13 and the fixation part 16.

The paper feeding part 12 includes a paper feed tray 121, a pickup roller 122, and a paper feeding roller pair 123. The paper feed tray 121 is mounted insertably/removably at the lower position of the apparatus body 11, and stores a sheet bundle P1 in which a plurality of sheets P are stacked. The pickup roller 122 feeds one sheet P at a time on the outermost surface of the sheet bundle P1 stored in the paper feed tray 121. The paper feeding roller pair 123 feeds, to the sheet delivery path 111, the sheet P that was fed by the pickup roller 122.

The paper feeding part 12 has a manual paper feeding part mounted on the left side face shown in FIG. 1 of the apparatus body 11. The manual paper feeding part includes a manual tray 124, a pickup roller 125, and a paper feeding roller pair 126. The manual tray 124 is a tray on which the sheets P are manually loaded, and is opened from the side face of the apparatus body 11 as shown in FIG. 1 upon feeding the sheets P manually. The pickup roller 125 sends out the sheets P loaded on the manual tray 124. The paper feeding roller pair 126 feeds, to the sheet delivery path 111, the sheets P that are sent out by the pickup roller 125.

The image forming part 13 is used for forming a toner image to be transferred to the sheet P, and includes a plurality of image forming units for forming a toner image of different colors. In this embodiment, the image forming unit includes a magenta unit 13M that uses a magenta (M) color developer, a cyan unit 13C that uses a cyan (C) color developer, a yellow unit 13Y that uses a yellow (Y) color developer, and a black unit 13Bk that uses a black (Bk) color developer, which are sequentially disposed from an upstream side to a downstream side (from the left side to the right side shown in FIG. 1) in the rotating direction of the intermediate transfer belt 141 described later. The respective units 13M, 13C, 13Y, 13Bk each include a photoreceptor drum 20, and a charging device 21, a developer device 23, a primary transfer roller 24 and a cleaning device 25 which are disposed around the photoreceptor drum 20. Moreover, an exposure device 22 that is common to the respective units 13M, 13C, 13Y, 13Bk is disposed at the lower part of the image forming unit.

The photoreceptor drum 20 is rotatably driven around its axis, and an electrostatic latent image and a toner image are formed on the peripheral face thereof. As the photoreceptor drum 20, a photoreceptor drum made from an amorphous silicon (a-Si)-based material may be used. The charging device 21 uniformly charges the surface of the photoreceptor drum 20. As the charging device 21, adopted may be a contact charging-type charging device including a charging roller, and a charging cleaning brush for removing the toner that adhered to the charging roller. The exposure device 22 includes a light source and various optical components such as a polygon mirror, a reflecting mirror, a deflecting mirror and the like, and forms an electrostatic latent image by emitting light, which was modulated based on image data, on the uniformly charged peripheral face of the photoreceptor drum 20.

The developer device 23 supplies to the toner to the peripheral face of the photoreceptor drum 20 in order to develop the electrostatic latent image formed on the photoreceptor drum 20. The developer device 23 uses a two-component developer that is made from a toner and a carrier, and includes two agitation rollers 23A, a magnetic roller 23B, and a developing roller 23C. The agitation roller 23A charges the toner by circulating, while agitating, the two-component developer. The two-component developer layer is carried on the peripheral face of the magnetic roller 23B, and a toner layer, which is formed by the toner being delivered and received based on the potential difference between the magnetic roller 23B and the developing roller 23C, is carried on the peripheral face of the developing roller 23C. The toner on the developing roller 23C is supplied to the peripheral face of the photoreceptor drum 20, and the electrostatic latent image is thereby developed.

The primary transfer roller 24 forms a primary transfer nip part with the photoreceptor drum 20 across the intermediate transfer belt 141 provided to the intermediate transfer unit 14, and primarily transfers the toner image on the photoreceptor drum 20 onto the intermediate transfer belt 141. Moreover, the cleaning device 25 cleans the peripheral face of the photoreceptor drum 20 after the transfer of the toner image.

The intermediate transfer unit 14 is disposed in a space provided between the image forming part 13 and the toner supplying part 15, and includes an intermediate transfer belt 141, and a drive roller 142 and a driven roller 143 which are rotatably supported by a unit frame not shown. The intermediate transfer belt 141 is an endless belt-shaped rotating body, and placed across the drive roller 142 and the driven roller 143 so that the peripheral face thereof comes into contact with the peripheral faces of the respective photoreceptor drums 20. Rotational drive force is applied to the drive roller 142, and the intermediate transfer belt 141 is turnably driven by the rotation of the drive roller 142.

A secondary transfer roller 145 is disposed facing the drive roller 142. The secondary transfer roller 145 forms a secondary transfer nip part by being pressed against the peripheral face of the intermediate transfer belt 141. The toner image that was primarily transferred onto the intermediate transfer belt 141 is secondarily transferred to the sheet P supplied from the paper feeding part 12 at the secondary transfer nip part.

The toner supplying part 15 is used for storing the toner that is used for forming the image and includes, in this embodiment, a magenta toner container 15M, a cyan toner container 15C, a yellow toner container 15Y and a black toner container 15Bk. The toner containers 15M, 15C, 15Y, 15Bk each store replenishing toner of the respective colors of MCYBk, and replenishes the toners of the respective colors to the developer device 23 of the image forming units 13M, 13C, 13Y, 13Bk corresponding to the respective colors of MCYBk from the toner discharge port 15H formed at the bottom face of the container.

The fixation part 16 includes a heating roller 161 that is internally equipped with a heating source, a fixing roller 162 placed opposite to the heating roller 161, a fixing belt 163 that is placed across the fixing roller 162 and the heating roller 161, and a pressure roller 164 placed opposite to the fixing roller 162 via the fixing belt 163 and forms a fixation nip part. The sheet P that is supplied to the fixation part 16 is heated and pressurized by passing through the fixation nip part. Consequently, the toner image that is transferred to the sheet P at the secondary transfer nip part is fixed to the sheet P.

The paper discharging part 17 is formed as a result of the apex of the apparatus body 11 being recessed, and a paper discharge tray 171 for receiving the discharged sheets P is formed at the bottom part of this recess. The sheet P that was subject to the fixation treatment is discharged toward the paper discharge tray 171 via the sheet delivery path 111 that is extended from the upper part of the fixation part 16.

Figure 2:
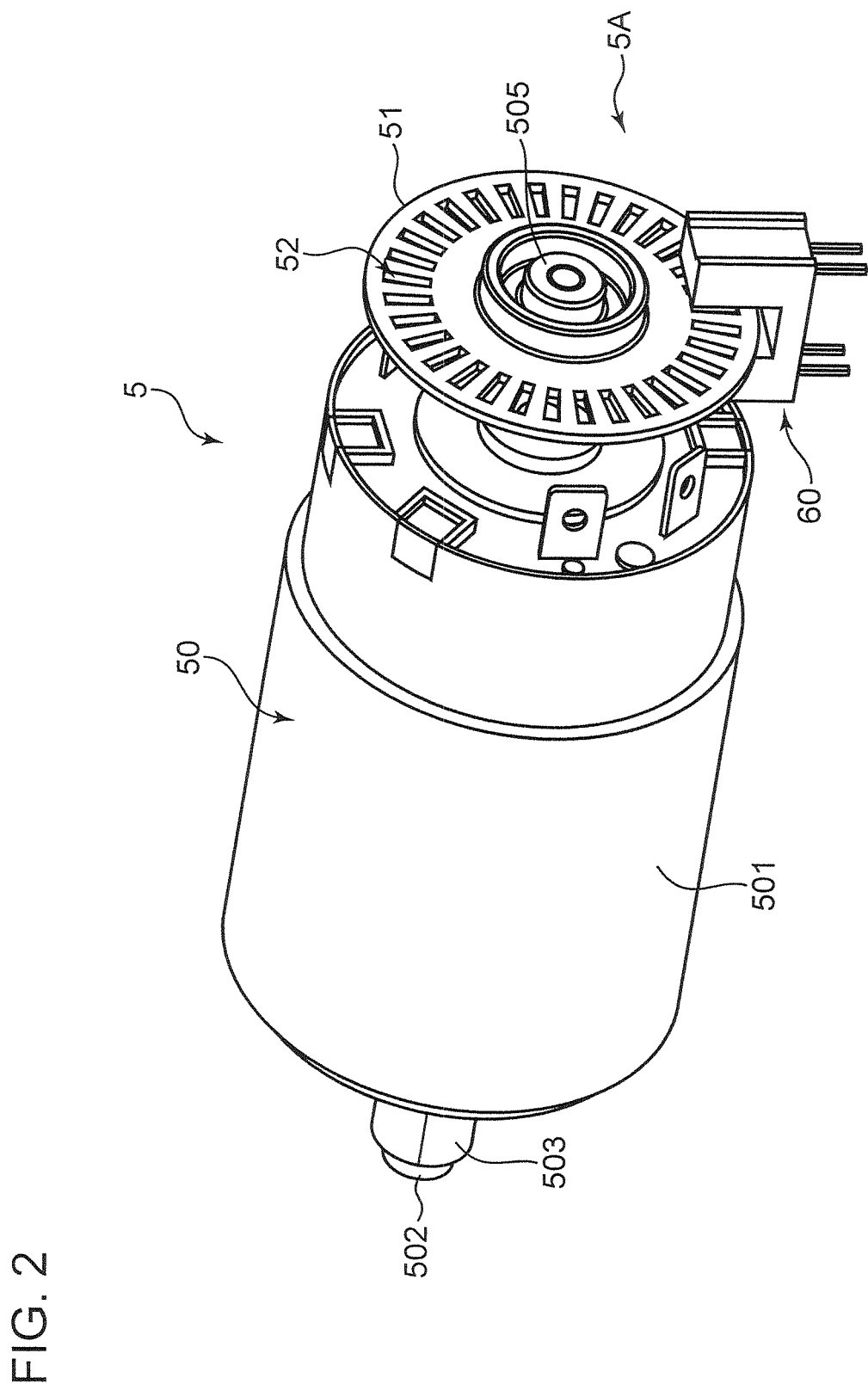
FIG. 2 is a perspective view of the driving device according to an embodiment of the present disclosure.
Figure 3:
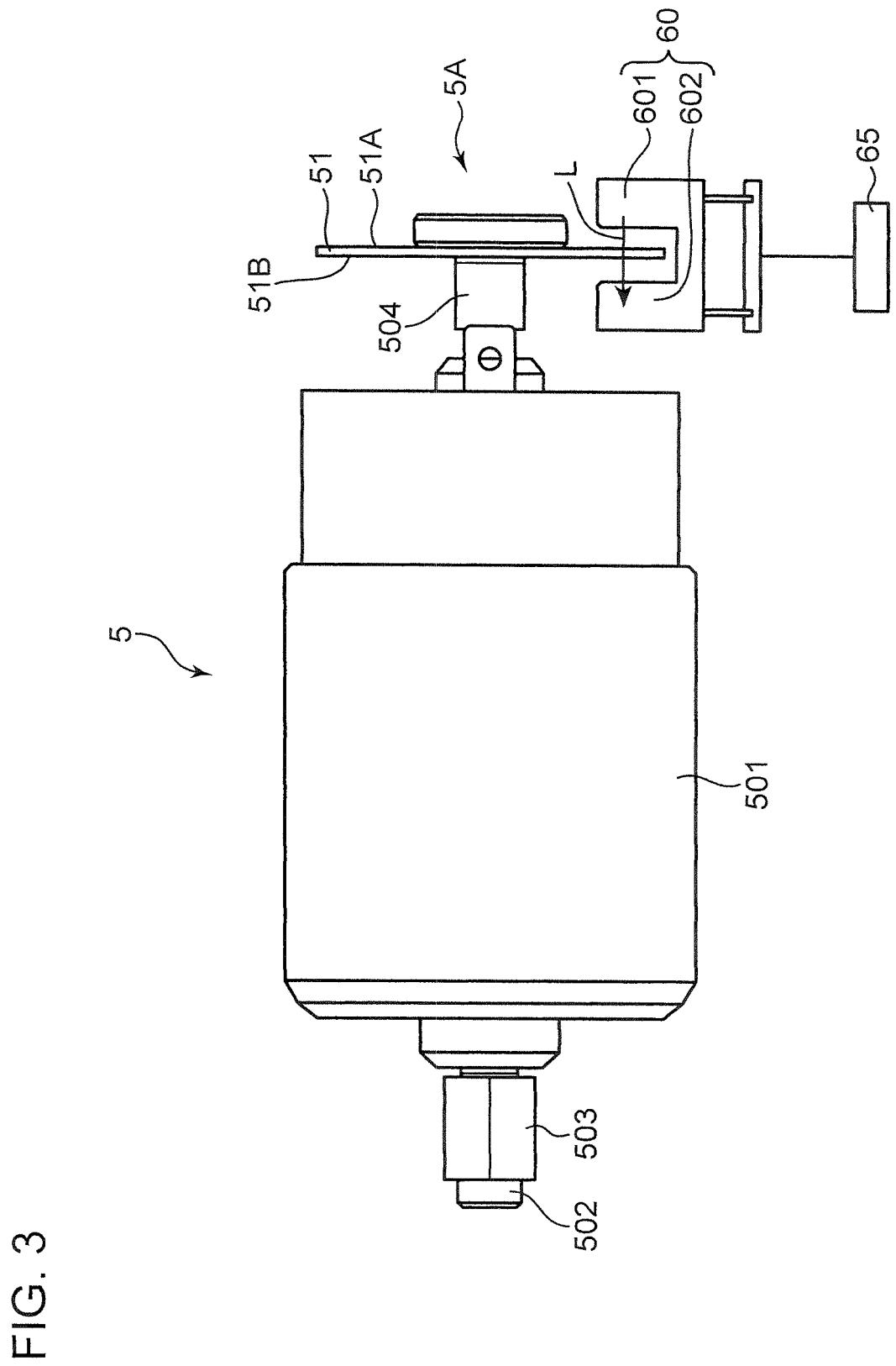
FIG. 3 is a side view of the driving device according to an embodiment of the present disclosure.
Figure 4:
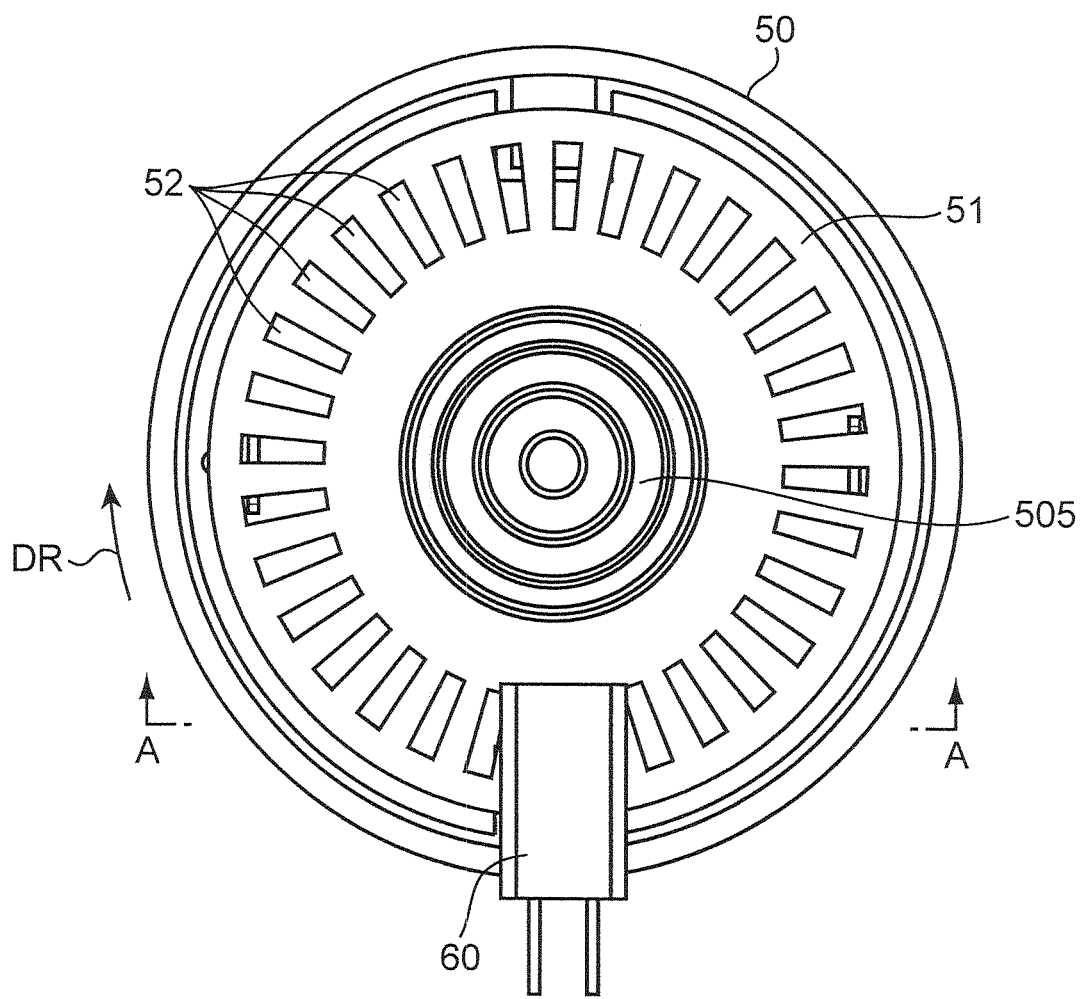
FIG. 4 is a front view of the driving device according to an embodiment of the present disclosure.

The motor unit 5 (driving device) according to this embodiment is now explained with reference to FIG. 2 to FIG. 4. The motor unit 5 generates rotational drive force for rotating the photoreceptor drum 20 or the intermediate transfer belt 141 carrying the image on its surface. FIG. 2 is a perspective view of the motor unit 5 according to this embodiment. FIG. 3 is a side view of the motor unit 5 according to this embodiment. Moreover, FIG. 4 is a front view of the motor unit 5 according to this embodiment.

The motor unit 5 includes a motor 50, and a rotating speed detection unit 5A (timing detection device). The motor 50 generates the foregoing rotational drive force. The motor 50 includes a motor body 501, a drive shaft 502, and an output gear 503.

The motor body 501 is a body part of the motor 50. The drive shaft 502 is a drive axis extending from the motor body 501. Moreover, the output gear 503 is a gear part that is externally fitted to one end of the drive shaft 502. The rotational drive force generated by the motor body 501 rotates the output gear 503 via the drive shaft 502. The output gear 503 is coupled to a drive transmission part not shown. The rotational drive force is transmitted to the photoreceptor drum 20 or the drive roller 142 for rotating the intermediate transfer belt 141 via the drive transmission part.

The rotating speed detection unit 5A is coupled to the drive shaft 502 of the motor 50, and detects the rotating speed of the drive shaft 502. Moreover, the rotating speed detection unit 5A functions as an encoder, and the detected rotating speed is converted into the travel distance of the photoreceptor drum 20 or the intermediate transfer belt 141 in the circumferential direction. In this embodiment, the characteristic value that is detected by the rotating speed detection unit 5A is collectively designated as the timing of movement.

The rotating speed detection unit 5A includes a pulse plate 51 (moving object), a PI sensor 60 (sensor unit), and a control unit 65 (FIG. 3) (timing detection unit).

The pulse plate 51 is formed from a disk member. In this embodiment, the pulse plate 51 is formed from a resin material. An open hole not shown, which is opened at the center part of the pulse plate 51, is externally fitted to another end of the drive shaft 502. In addition, a sealing part 505 shown in FIG. 2 is fitted with an engaging part 504 shown in FIG. 3 so as to sandwich the pulse plate 51. Consequently, the pulse plate 51 is integrally fixed to the drive shaft 502. In addition, the pulse plate 51 is rotatably moved, integrally with the drive shaft 502, in the direction of the arrow DR of FIG. 4 around the drive shaft 502. Referring to FIG. 3, the pulse plate 51 includes an outer face part 51A (first face) and an inner face part 51B (second face). The inner face part 51B is face on a side that is opposite to the outer face part 51A. The pulse plate 51 has a predetermined thickness between the outer face part 51A and the inner face part 51B. Pursuant to the rotation of the pulse plate 51, the outer face part 51A and the inner face part 51B of the pulse plate 51 move in a moving direction that is parallel to the outer face part 51A and the inner face part 51B. Moreover, a slit 52 (FIG. 4) (opening) is formed in the pulse plate 51.

The slit 52 is formed to penetrated from the outer face part 51A to the inner face part 51B in the pulse plate 51, and a plurality of slits 52 are formed with a spacing along the rotational movement direction (circumferential direction of the pulse plate 51, arrow DR direction of FIG. 4). In this embodiment, thirty-two slits 52 are formed in the circumferential direction of the pulse plate 51.

The PI sensor 60 emits detection light from the side of the outer face part 51A toward the pulse plate 51, and receives the detection light that passed through the slits 52 on the side of the inner face part 51B. Specifically, the PI sensor 60 includes a light emitting part 601 and a light-receiving part 602. The detection light is emitted from the light emitting part 601. Moreover, the detection light is received by the light-receiving part 602. The light emitting part 601 and the light-receiving part 602 of the PI sensor 60 are disposed so as to sandwich the outer peripheral part of the pulse plate 51. Accordingly, the timing of movement is favorably detected based on the rotational movement of the pulse plate 51 around the drive shaft 502.

The control unit 65 detects the timing of the rotational movement of the pulse plate 51 based on the pulse signal of the detection light received by the light-receiving part 602. When the pulse signal is detected in a cycle worth 32 detections, the control unit 65 determines that the pulse plate 51 (drive shaft 502) has rotated once. Based on this pulse signal, the control unit 65 can detect the position of the photoreceptor drum 20 or the intermediate transfer belt 141 in the circumferential direction. Moreover, based on the number of detects of the pulse signal per unit time, the control unit 65 detects the rotational speed of the pulse plate 51 (drive shaft 502) or the photoreceptor drum 20 or the intermediate transfer belt 141.

Furthermore, in this embodiment, the control unit 65 detects the timing based on a change (falling part of the signal) from a state where the detection light is blocked by the outer face part 51A (HIGH signal) to a state where the detection light is received by the light-receiving part 602 (LOW signal) in the pulse signal of the detection light. This is because, in comparison to the case of detecting the timing based on a change (rising part of the signal) from a state where the detection light is received by the light-receiving part 602 (LOW signal) to a state where the detection light is blocked by the outer face part 51A (HIGH signal), the detection of timing is hardly affected by the rising time of the emitted light itself.

Figure 5:
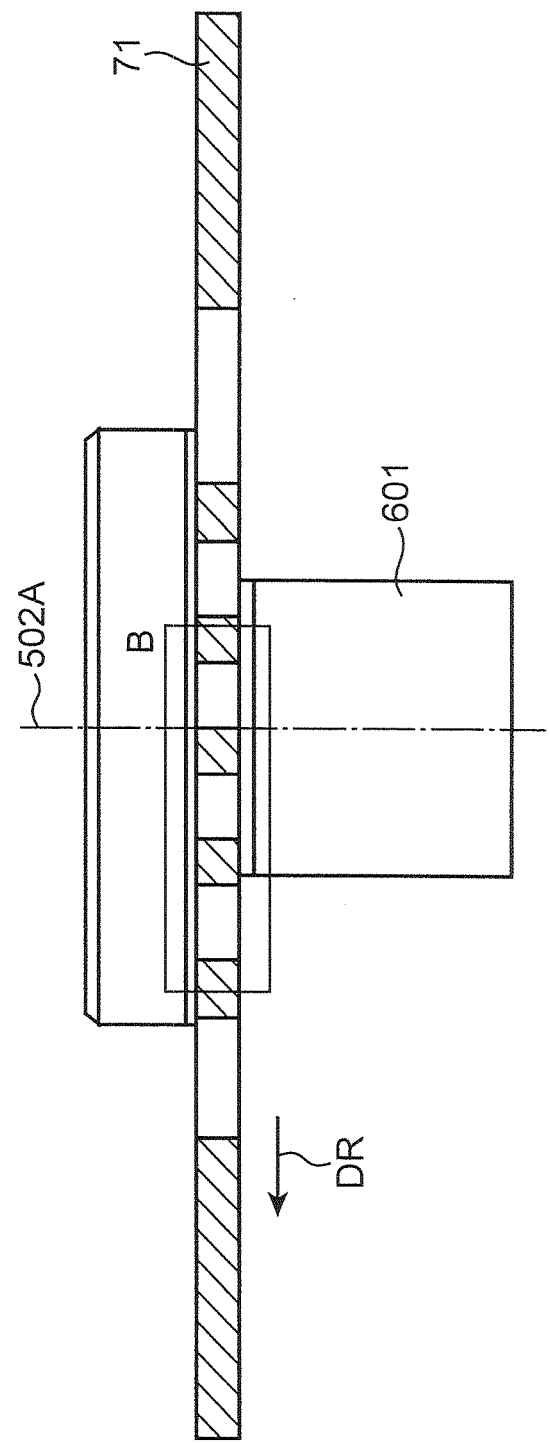
FIG. 5 is a cross section of another moving object that is compared with the moving object according to an embodiment of the present disclosure.
Figure 6:
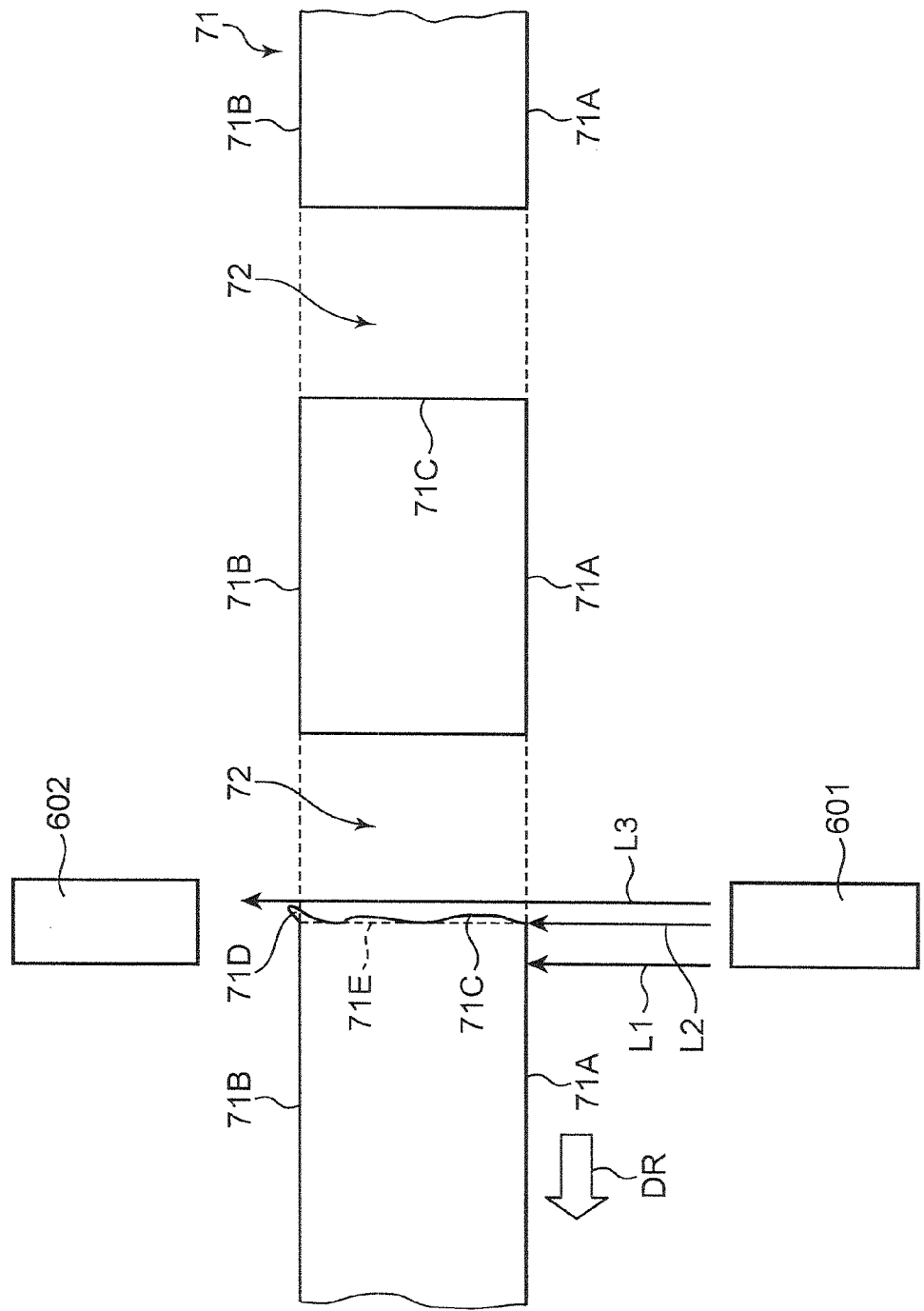
FIG. 6 is an enlarged cross section of the other moving object of FIG. 5.
Figure 7:
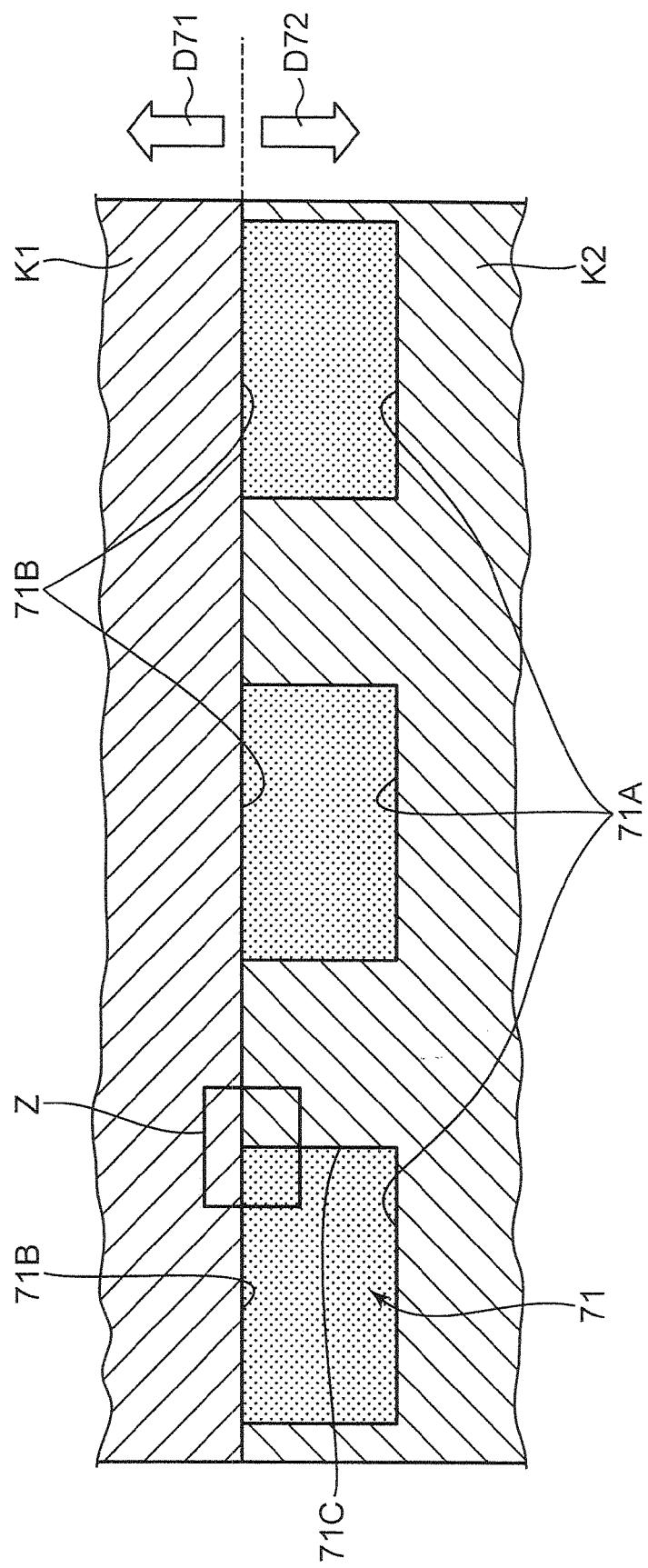
FIG. 7 is a cross section of the mold that is used for molding the other moving object of FIG. 5.

The configuration and problems of the pulse plate 71 is now compared with the pulse plate 51 according to this embodiment and explained with reference to FIG. 5 to FIG. 7. FIG. 5 is a cross section of the pulse plate 71. FIG. 6 is an enlarged cross section of the pulse plate 71 in the area B of FIG. 5. FIG. 7 is a cross section of the mold that is used for molding the pulse plate 71.

With reference to FIG. 5 and FIG. 6, the pulse plate 71 has an outer face part 71A and an inner face part 71B same as the pulse plate 51 according to this embodiment. Moreover, the pulse plate 71 has a plurality of slits 72 with a spacing in the circumferential direction. In addition, the slits 72 are formed by penetrating the pulse plate 71 from the outer face part 71A to the inner face part 71B. Moreover, the pulse plate 71 has an inner wall part 71C. The inner wall part 71C demarcates the lateral edge of the slits 72 on the downstream side in the rotational movement direction (arrow DR of FIG. 6) of the pulse plate 71. With the pulse plate 71, the inner wall part 71C is extended so as to be orthogonal to the outer face part 71A and the inner face part 71B.

With reference to FIG. 6, in one state, the detection light emitted from the light emitting part 601 is blocked by the outer face part 71A (L1 of FIG. 6). Moreover, in another state, the detection light emitted from the light emitting part 601 passes through the slits 72 and is received by the light-receiving part 602 (L3 of FIG. 6). Subsequently, pursuant to the rotational movement of the pulse plate 71, a pulse signal corresponding to one slit 72 is detected as a result of the inner wall part 71C being separated from the detection light (L2 of FIG. 6).

Upon producing the pulse plate 71, when the profile irregularity of the inner wall part 71C is low, and slight irregularities are formed on the surface of the inner wall part 71C. Consequently, as shown in FIG. 6, an error occurs between the inner wall part 71C, and the design virtual inner wall part 71E. Thus, the timing that the end point of the outer face part 71A (start point of the slit 72) is detected will vary. In addition, as shown with the burr 71D of FIG. 6, the detected timing will also vary when a production burr occurs on the end face of the pulse plate 71.

FIG. 7 is one example of a cross section of the mold for producing the pulse plate 71 that is configured from a resin mold. A resin material is injected between a cavity part K1 and a core part K2, and the cavity part K1 and the core part K2 are respectively separated and moved in the direction of the arrows D71, D72. The pulse plate 71 is thereby molded. When the cavity part K1 and the core part K2 are separated and moved, the burr 71D of FIG. 6 tends to occur in the area Z of FIG. 7. Accordingly, the pulse plate 71 has a problem in that an error occurs in the detection timing caused by the profile irregularity of the inner wall part 71C or the burr 71D.

Figure 8:
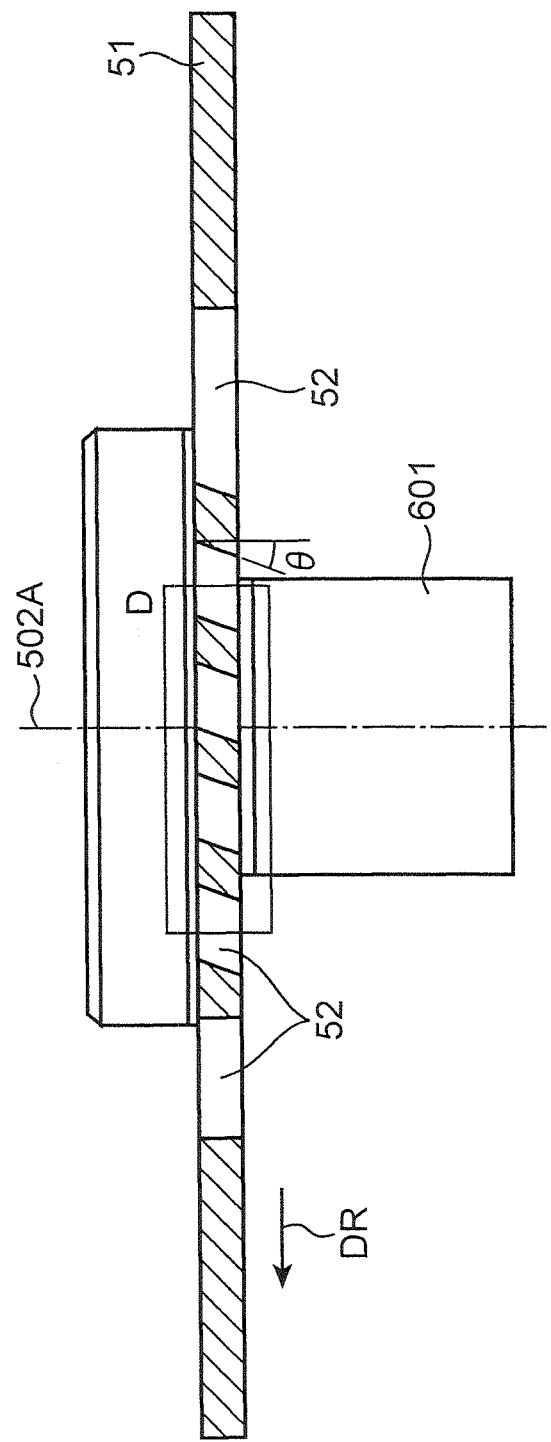
FIG. 8 is a cross section of the moving object according to an embodiment of the present disclosure.
Figure 9:
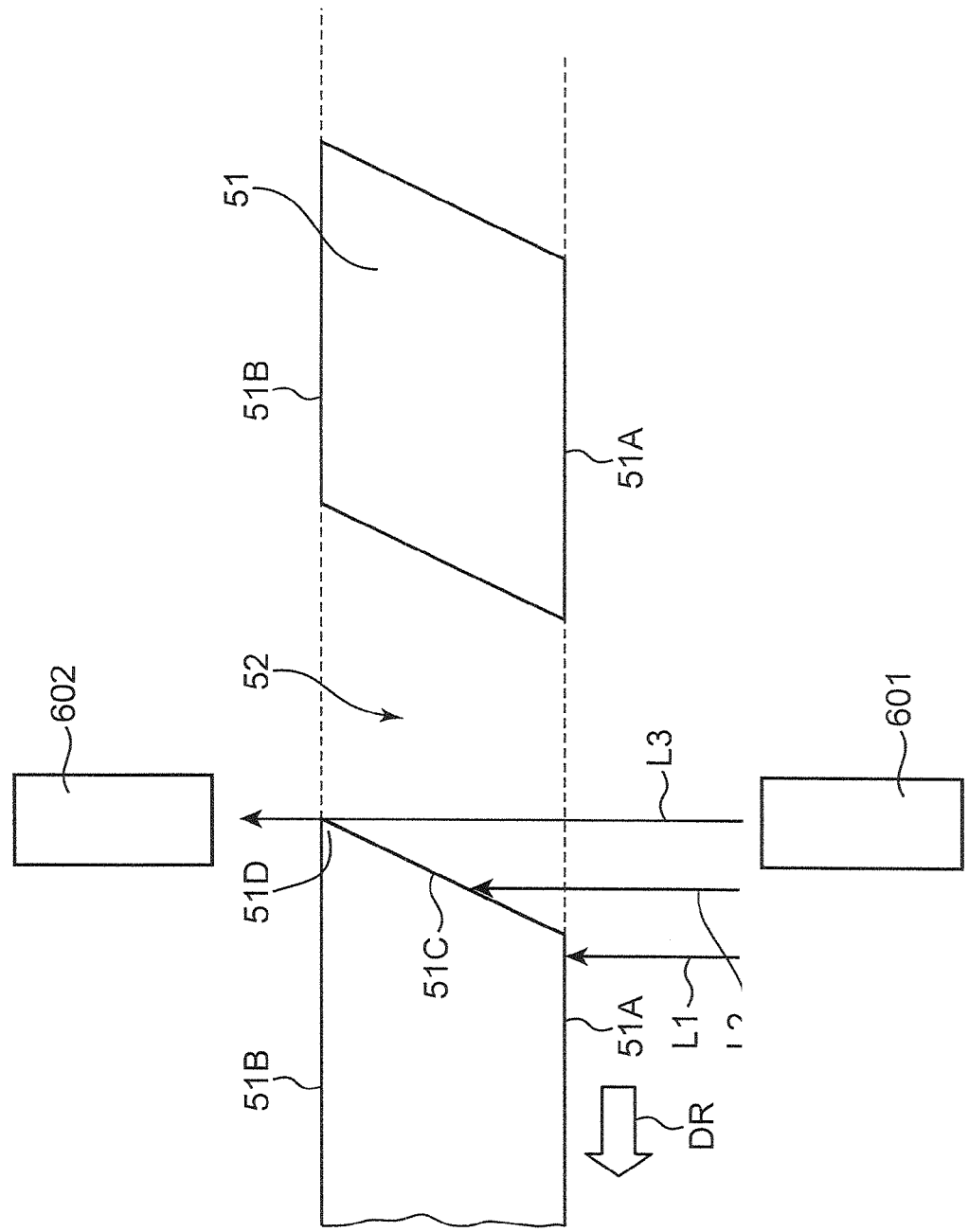
FIG. 9 is an enlarged cross section of the moving object of FIG. 8.
Figure 10:
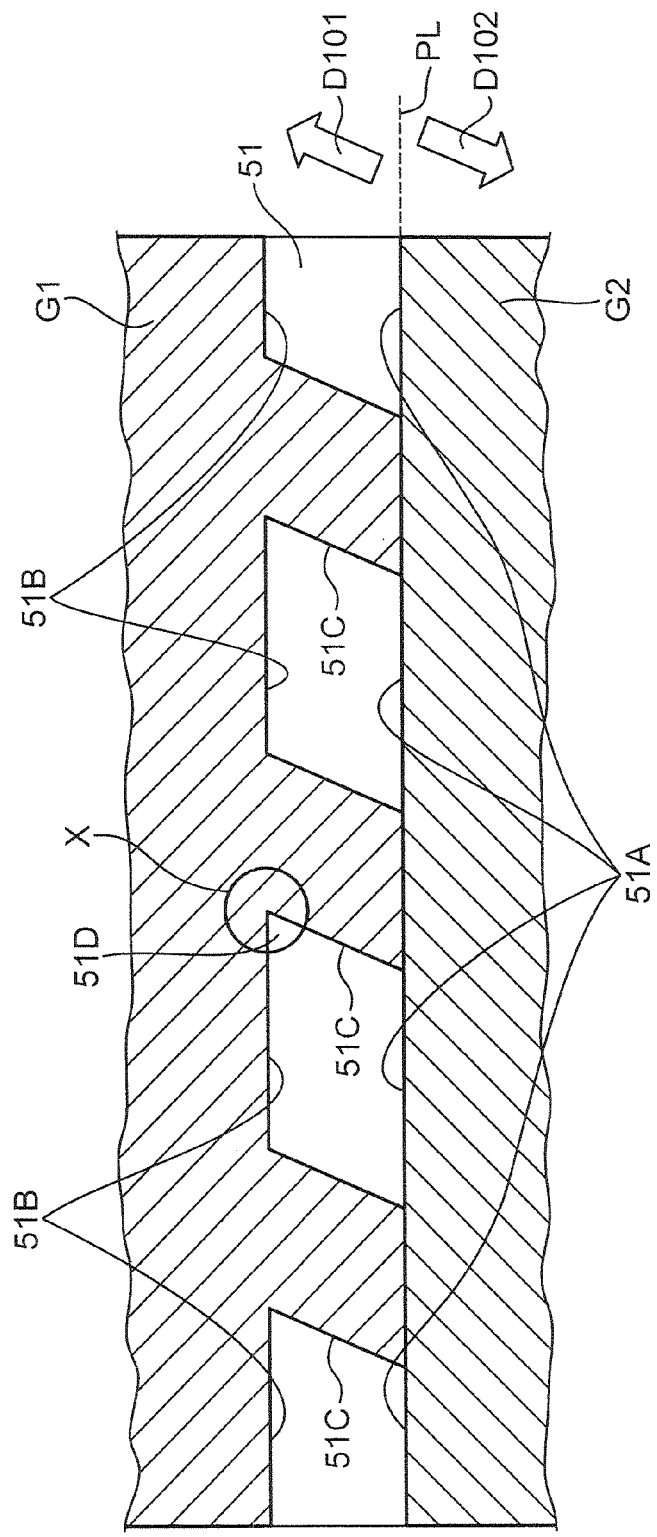
FIG. 10 is a cross section of the mold that is used for molding the moving object of FIG. 8.

In order to resolve the foregoing problems, the pulse plate 51 according to this embodiment is unique with regard to the shape of the inner wall part 51C. The configuration and effect of the pulse plate 51 according to this embodiment are now explained with reference to FIG. 8 to FIG. 10. FIG. 8 is a cross section of the pulse plate 51. FIG. 9 is an enlarged cross section of the pulse plate 51 in the area D of FIG. 8. FIG. 10 is a cross section of the mold that is used for molding the pulse plate 51.

The pulse plate 51 has an inner wall part 51C (FIG. 9). In a cross sectional view, shown in FIG. 9, including the rotational movement direction (arrow DR) of the pulse plate 51 and the thickness direction of the pulse plate 51 heading from the outer face part 51A toward the inner face part 51B, the inner wall part 51C demarcates the lateral edge of the slit 52 on the downstream side in the rotational movement direction. Specifically, in the cross sectional view, the inner wall part 51C inclines so that the side of the inner face part 51B is disposed more on the upstream side in the moving direction than the side of the outer face part 51A. Moreover, the inner wall part 51C has an edge part 51D. The edge part 51D is provided in a protruding manner toward the upstream side in the rotational movement direction at the end fringe part on the side of the inner face part 51B of the inner wall part 51C. In this embodiment, the edge part 51D is formed on the side of the inner face part 51B based on the inclination of the inner wall part 51C.

The detection light emitted from the light emitting part 601 is blocked by the outer face part 51A (L1 of FIG. 9), and also reliably blocked by the inner wall part 51C (L2 of FIG. 9). In other words, the detection light emitted to the inner wall part 51C will not enter the side of the light-receiving part 602. In addition, the detection light is accurately received by the light-receiving part 602 (L3 of FIG. 9) by the edge part 51D formed on the side of the inner face part 51B of the inner wall part 51C being separated from the detection light. In other words, in comparison to the case of the foregoing pulse plate 71 in which the inner wall part 51C is disposed orthogonal to the outer face part 51A and the inner face part 51B, it is possible to inhibit the deviation in the detection timing caused by the profile irregularity of the inner wall part 51C. Subsequently, the control unit 65 detects the timing of movement of the pulse plate 51 based on a change in a state where the detection light is blocked by the edge part 51D to a state where the detection light passes through the slits 52 pursuant to the rotational movement of the pulse plate 51. Consequently, the timing of movement of the pulse plate 51 can be accurately detected without being affected by the profile irregularity of the inner wall part 51C. Moreover, the detection of the timing of movement will hardly be affected by the rise of the pulse signal itself.

Moreover, in this embodiment, the edge part 51D is formed with a simple configuration based on the inclination of the inner wall part 51C.

Furthermore, in this embodiment, the pulse plate 51 is molded with the mold shown in FIG. 10.

The pulse plate 51 is molded with a plurality of molds (cavity part G1 and core part G2) that can be separated to the side of the outer face part 51A and the side of the inner face part 51B. A resin material is injected between the cavity part G1 and the core part G2, and the cavity part G1 and the core part G2 are respectively separated and moved in the direction of arrows D101 and D102. The pulse plate 51 is consequently molded. Here, the separation position PL (parting line) of the cavity part G1 and the core part G2 is placed at a position at a distance, with a spacing in the thickness direction of the pulse plate 51, from the area X where the edge part 51D is disposed. In this embodiment, the separation position PL is disposed so as to overlap with the outer face part 51A on a side that is opposite to the edge part 51D in the thickness direction. According to this kind of mold structure, since the edge part 51D is formed at the bottom part of the recess of the cavity part G1, the burr associated with the separation of the mold is inhibited from being formed on the edge part 51D. Thus, the edge part 51D can be accurately formed, and the timing of movement can be stably detected.

Note that, even when the inner wall part 51C inclines as described above, as shown with the arrows D101, D102 of FIG. 10, the cavity part G1 and the core part G2 are moved and separated from each other in a direction that inclines relative to the thickness direction of the pulse plate 51 (along the incline direction of the inner wall part 51C) so that the pulse plate 51 can be accurately molded. In other words, the cavity part G1 and the core part G2 are separated by moving away from each other in the axial direction while rotating around the rotating axis 502A (refer to FIG. 8) of the pulse plate 51 in mutually opposite directions along the rotating direction of the pulse plate 51. Thus, it is possible to inhibit the edge part 51D from interfering with the mold when the molds are separated from each other.

Note that, in another embodiment, the pulse plate 51 may also be molded by one of either the cavity part G1 or the core part G2 being fixed, and the other moving the axial direction while rotating, so that the cavity part G1 and the core part G2 become separated.

The rotating speed detection unit 5A according to an embodiment of the present disclosure, and the motor unit 5 and the image forming apparatus 10 having the rotating speed detection unit 5A were explained. According to the foregoing configuration, the timing of movement of the pulse plate 51 is detected stably. Moreover, based on the detected timing, it is possible to realize the drive control of the photoreceptor drum 20 or the intermediate transfer belt 141. Note that the present disclosure is not limited to the foregoing configuration and, for example, may also adopt the following modified embodiment.

Figure 11:
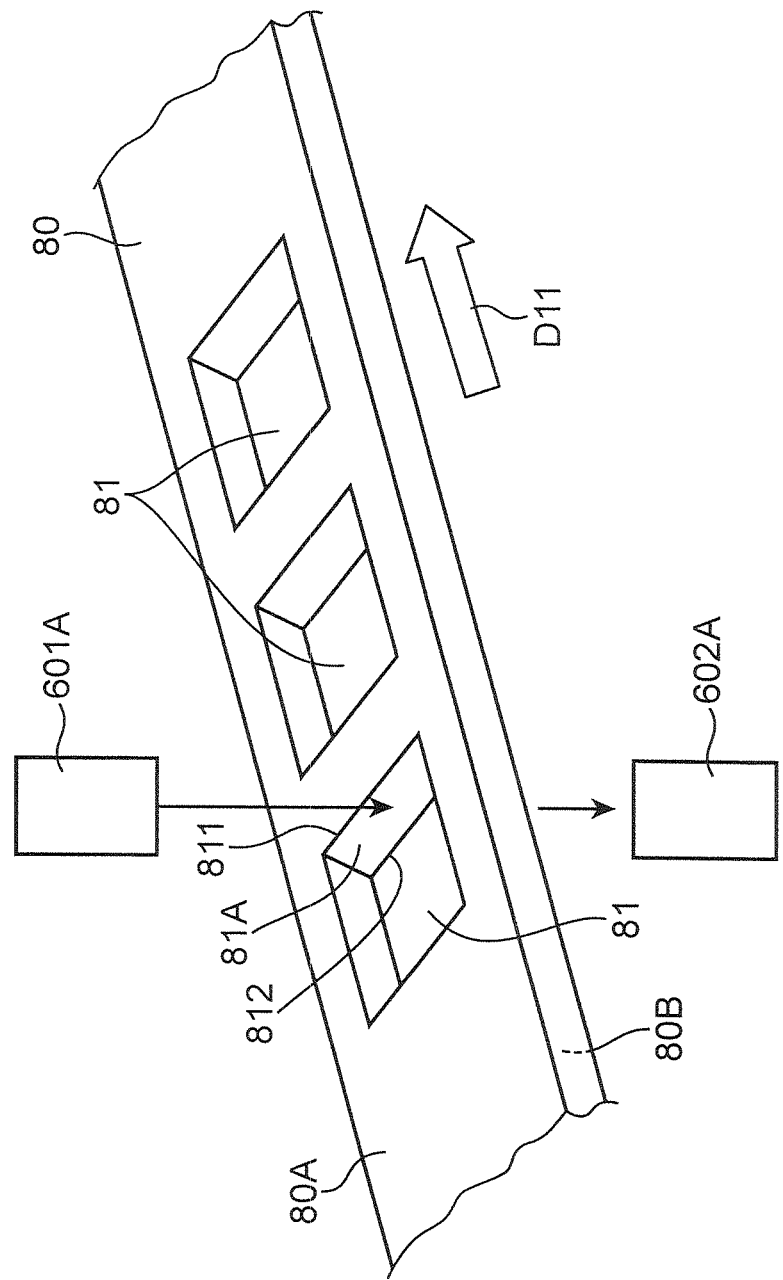
FIG. 11 is a perspective view of the moving object according to another embodiment of the present disclosure.

(1) In the foregoing embodiment, while the pulse plate 51 which is rotatably moved was explained as the moving object, the present disclosure is not limited thereto. FIG. 11 is a perspective view of a belt 80 as the moving object in a modified embodiment of the present disclosure. The belt 80 is moved in the direction of the arrow D11 of FIG. 11. The belt 80 is a belt that is extended along the moving direction. The belt 80 includes a front face part 80A and a rear face part 80B. Moreover, a hole part 81 is provided so as to penetrate the belt 80 from the front face part 80A toward the rear face part 80B. A plurality of hole parts 81 are disposed in a spacing along the moving direction of the belt 80. Detection light that was emitted by a light emitting part 601A is received by a light-receiving part 602A via the belt 80. The side face part of the hole part 81 on the downstream side in the moving direction is demarcated by an inner wall part 81A. In this modified embodiment, of the inner wall part 81A, a lateral edge 812 on the side of the rear face part 80B is disposed more upstream in the moving direction than a lateral edge 811 on the side of the front face part 80A. In other words, an edge part is formed at the lateral edge 812. In this configuration also, as a result of the lateral edge 812 breaking away from the detection light pursuant to the movement of the belt 80, the timing of movement of the belt 80 can be detected accurately.

(2) In the foregoing embodiment, as shown in FIG. 9, a mode where the edge part 51D is disposed on the side of the inner face part 51B was explained, but the present disclosure is not limited thereto. The inner wall part 51C may also be disposed by being inclined toward the opposite direction as FIG. 9, and the edge part 51D may be disposed on the side of the outer face part 51A (first face side). Moreover, the edge part 51D is not limited to the configuration of being disposed at the inner wall part 51C on the downstream side in the moving direction of the inner wall part that demarcates the slit 52. The edge part 51D may also be disposed at the inner wall part on the upstream side in the moving direction facing the inner wall part 51C, and protrude toward the downstream side in the moving direction. In the foregoing case, the timing of movement of the pulse plate 51 is detected based on the timing that the edge part 51D enters the detection light.

Although the present disclosure has been fully described by way of example with reference to the accompanying drawings, it is to be understood that various changes and modifications will be apparent to those skilled in the art. Therefore, unless otherwise such changes and modifications depart from the scope of the present disclosure hereinafter defined, they should be construed as being included therein.

The invention claimed is:

1. A timing detection device, comprising:
   a moving object which includes a first face and a second face placed opposite to the first face, has a predetermined thickness between the first face and the second face, and in which the first face and the second face move in a moving direction that is parallel to the first face and the second face;
   a plurality of openings which are formed by penetrating the moving object from the first face to the second face, and disposed with a spacing along the moving direction;
   a sensor unit which emits detection light from the first face side toward the moving object, and receives the detection light that passes through the openings on the second face side; and
   a timing detection unit which detects timing of movement of the moving object based on a pulse signal of the received detection light; wherein
   in a cross sectional view including the moving direction of the moving object and a thickness direction of the moving object from the first face toward the second face, the moving object includes:
      an inner wall part which demarcates a lateral edge of the openings on an upstream side or a downstream side in the moving direction; and
      an edge part which protrudes toward the downstream side or the upstream side in the moving direction at an end fringe part on the first face side or the second face side of the inner wall part;
   the moving object is molded with a plurality of molds that are separable into respective segments on the first face side and the second face side, and
   a separation position of the plurality of molds is placed at a position at a distance, with a spacing and in the thickness direction of the moving object, from the edge part.

2. The timing detection device according to claim 1, wherein the inner wall part demarcates a lateral edge of the openings on the downstream side in the moving direction and, in the cross sectional view, the inner wall part inclines so that the second face side is disposed further toward the upstream side in the moving direction than the first face side, the edge part is formed at an end fringe part on the second face side due to the inclination of the inner wall part, and the timing detection unit detects the timing of movement based on a change from a state of the detection light being blocked by the edge part to a state of the detection light passing through the openings as a result of the movement of the moving object.

3. The timing detection device according to claim 2, wherein:
   the moving object is formed by the plurality of molds that are separated while moving along the incline direction of the inner wall part.

4. The timing detection device according to claim 1, wherein the moving object is a disk member that is rotatably moved in a rotating direction, as the moving direction, around a predetermined rotating axis, and the openings are a plurality of slits that are opened with a spacing along a circumferential direction in the disk member.

5. The timing detection device according to claim 4, wherein:
   the moving object is formed by the plurality of molds that are separated as a result of the plurality of molds rotating along the rotating direction while moving in an axial direction of the rotating axis.

6. A timing detection, comprising:
   a moving object that includes a first face and a second face placed opposite to the first face, has a predetermined thickness between the first face and the second face, and in which the first face and the second face move in a moving direction that is parallel to the first face and the second face;
   a plurality of openings that are formed by penetrating the moving object from the first face to the second face, and disposed with a spacing along the moving direction;
   a sensor unit that emits detection light from the first face side toward the moving object, and receives the detection light that passes through the openings on the second face side;
   a timing detection unit that detects timing of movement of the moving object based on a pulse signal of the received detection light; wherein
   in a cross sectional view including the moving direction of the moving object and a thickness direction of the moving object from the first face toward the second face, the moving object includes:
      an inner wall part that demarcates a lateral edge of the openings on an upstream side or a downstream side in the moving direction; and
      an edge part that protrudes toward the downstream side or the upstream side in the moving direction at an end fringe part on the first face side or the second face side of the inner wall part; and
   the moving object is a belt that is extended along the moving direction.

7. A driving device, comprising:
   a timing detection device which has a moving object; and
   a drive unit which generates driving force configured to move the moving object, the timing detection device including:

the moving object which includes a first face and a second face placed opposite to the first face, has a predetermined thickness between the first face and the second face, and in which the first face and the second face move in a moving direction that is parallel to the first face and the second face;

a plurality of openings which are formed by penetrating the moving object from the first face to the second face, and disposed with a spacing in the moving direction;

a sensor unit which emits detection light from the first face side toward the moving object, and receives the detection light that passes through the openings on the second face side; and a timing detection unit which detects timing of movement of the moving object based on a pulse signal of the received detection light, wherein in a cross sectional view including the moving direction of the moving object and a thickness direction of the moving object from the first face toward the second face, the moving object includes:

an inner wall part which demarcates a lateral edge of the openings on an upstream side or a downstream side in the moving direction; and an edge part which protrudes toward the downstream side or the upstream side in the moving direction at an end fringe part on the first face side or the second face side of the inner wall part, and wherein:

the moving object is molded with a plurality of molds that are separable into respectable segments on the first face side and the second face side, and a separation position of the plurality of molds is placed at a position at a distance, with a spacing and in the thickness direction of the moving object, from the edge part.

8. The driving device according to claim 7, wherein the inner wall part demarcates a lateral edge of the openings on the downstream side in the moving direction and, in the cross sectional view, the inner wall part inclines so that the second face side is disposed further toward the upstream side in the moving direction than the first face side, the edge part is formed at an end fringe part on the second face side due to the inclination of the inner wall part, and the timing detection unit detects the timing of movement based on a change from a state of the detection light being blocked by the edge part to a state of the detection light passing through the openings as a result of to the movement of the moving object.

9. The driving device according to claim 8, wherein:

the moving object is formed by the plurality of molds which are separated while moving along the incline direction of the inner wall part.

10. The driving device according to claim 7, wherein the moving object is a disk member that is rotatably moved in a rotating direction, as the moving direction, around a predetermined rotating axis, and the openings are a plurality of slits that are opened with a spacing along a circumferential direction in the disk member.

11. The driving device according to claim 10, wherein:

the moving object is formed by the plurality of molds which are separated as a result of the plurality of molds rotating along the rotating direction while moving in an axial direction of the rotating axis.

12. An image forming apparatus, comprising:

a timing detection device which has a moving object;

a drive unit which generates driving force configured to move the moving object; and an image carrier which is rotatably driven by the drive unit and carries an image on a surface thereof;

the timing detection device including:

the moving object which includes a first face and a second face placed opposite to the first face, has a predetermined thickness between the first face and the second face, and in which the first face and the second face move in a moving direction that is parallel to the first face and the second face;

a plurality of openings which are formed by penetrating the moving object from the first face to the second face, and disposed with a spacing along the moving direction;

a sensor unit which emits detection light from the first face side toward the moving object, and receives the detection light that passes through the openings on the second face side; and a timing detection unit which detects timing of movement of the moving object based on a pulse signal of the received detection light; wherein in a cross sectional view including the moving direction of the moving object and a thickness direction of the moving object from the first face toward the second face, the moving object includes:

an inner wall part which demarcates a lateral edge of the openings on an upstream side or a downstream side in the moving direction; and an edge part which protrudes toward the downstream side or the upstream side in the moving direction at an end fringe part on the first face side or the second face side of the inner wall part; and the moving object is molded with a plurality of molds that are separable into respective segments on the first face side and the second face side, and a separation position of the plurality of molds is placed at a position at a distance, with a spacing and in the thickness direction of the moving object, from the edge part.

13. The image forming apparatus according to claim 12, wherein the inner wall part demarcates a lateral edge of the openings on the downstream side in the moving direction and, in the cross sectional view, the inner wall part inclines so that the second face side is disposed further toward the upstream side in the moving direction than the first face side, the edge part is formed at an end fringe part on the second face side due to the inclination of the inner wall part, and the timing detection unit detects the timing of movement based on a change from a state of the detection light being blocked by the edge part to a state of the detection light passing through the openings as a result of the movement of the moving object.

14. The image forming apparatus according to claim 13, wherein:

the moving object is formed by the plurality of molds which are being separated while moving along the incline direction of the inner wall part.

15. The image forming apparatus according to claim 12, wherein the moving object is a disk member that is rotatably moved in a rotating direction, as the moving direction, around a predetermined rotating axis, and the openings are a plurality of slits that are opened with a spacing along a circumferential direction in the disk member.

16. The image forming apparatus according to claim 15, wherein:
the moving object is formed by the plurality of molds which are separated as a result of the plurality of molds rotating along the rotating direction while moving in an axial direction of the rotating axis.

* * * * *